(12) United States Patent
Öhman

(10) Patent No.: US 11,027,626 B2
(45) Date of Patent: Jun. 8, 2021

(54) METHOD FOR CONTROLLING ELECTRICAL POWER TRANSMISSION TO A VEHICLE

(71) Applicant: VOLVO TRUCK CORPORATION, Gothenburg (SE)

(72) Inventor: Mikaela Öhman, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 278 days.

(21) Appl. No.: 15/770,637

(22) PCT Filed: Nov. 13, 2015

(86) PCT No.: PCT/EP2015/076568
§ 371 (c)(1),
(2) Date: Apr. 24, 2018

(87) PCT Pub. No.: WO2017/080619
PCT Pub. Date: May 18, 2017

(65) Prior Publication Data
US 2019/0054833 A1 Feb. 21, 2019

(51) Int. Cl.
*H02J 7/00* (2006.01)
*B60M 1/36* (2006.01)
(Continued)

(52) U.S. Cl.
CPC ............... *B60M 1/36* (2013.01); *B60L 5/42* (2013.01); *B60L 53/126* (2019.02); *B60L 53/14* (2019.02);
(Continued)

(58) Field of Classification Search
CPC .................................................. B60L 11/1837
(Continued)

(56) References Cited

U.S. PATENT DOCUMENTS 8,418,824 B2 * 4/2013 Aguilar ................. B60L 5/36
191/220
8,483,895 B1 6/2013 Beregi
(Continued)

FOREIGN PATENT DOCUMENTS

CN 105048650 A 11/2015
EP 2849312 A1 * 3/2015 ............. B60L 53/00
(Continued)

OTHER PUBLICATIONS

International Search Report (dated Jul. 21, 2016) for corresponding International App. PCT/EP2015/076568.
(Continued)

*Primary Examiner* — Yalkew Fantu
(74) *Attorney, Agent, or Firm* — Venable LLP; Jeffri A. Kaminski

(57) ABSTRACT

A method for controlling electrical power transmission to a vehicle is provided, the vehicle including a charging component receiving electrical charge current from individually controlled charge segments along a road for the vehicle, wherein the method includes the steps of receiving a signal indicative of a charge current mode for the charge segments along the road; determining if at least one charge segment ahead of the vehicle is provided in a disabled charge mode and currently not being able to provide an electrical charge current; calculating a time period until the vehicle arrives at the charge segment provided in the disabled charge mode; and shutting off the electrical power transmission to the vehicle within a predetermined time period of the calculated time period.

14 Claims, 4 Drawing Sheets

(51) Int. Cl.
*B60L 5/42* (2006.01)
*B60M 1/10* (2006.01)
*B60L 53/63* (2019.01)
*B60L 53/14* (2019.01)
*B60L 53/36* (2019.01)
*B60L 53/68* (2019.01)
*B60L 53/30* (2019.01)
*B60L 53/39* (2019.01)
*B60L 53/67* (2019.01)
*B60L 53/126* (2019.01)

(52) U.S. Cl.
CPC .............. *B60L 53/32* (2019.02); *B60L 53/36* (2019.02); *B60L 53/39* (2019.02); *B60L 53/63* (2019.02); *B60L 53/67* (2019.02); *B60L 53/68* (2019.02); *B60M 1/10* (2013.01); *B60L 2200/36* (2013.01); *B60L 2240/80* (2013.01); *B60L 2260/52* (2013.01); *B60L 2260/54* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y04S 10/126* (2013.01)

(58) Field of Classification Search
USPC .......................................................... 320/104
See application file for complete search history.

(56) References Cited

U.S. PATENT DOCUMENTS

| | | | |
|---|---|---|---|
| 2013/0035823 A1* | 2/2013 | Yoshida | G06Q 50/30 701/31.5 |
| 2013/0037367 A1 | 2/2013 | Aguilar | |
| 2014/0125286 A1* | 5/2014 | Cho | B60L 53/39 320/128 |
| 2014/0139199 A1 | 5/2014 | Ichikawa et al. | |

FOREIGN PATENT DOCUMENTS

| | | |
|---|---|---|
| EP | 2849312 A1 | 3/2015 |
| JP | 2011166992 A | 8/2011 |
| WO | 03104016 A1 | 12/2003 |
| WO | 2011046405 A2 | 4/2011 |
| WO | 2015049969 A1 | 4/2015 |

OTHER PUBLICATIONS

China Office Action dated Nov. 4, 2020 in corresponding China Patent Application No. 201580084534.X, 19 pages.

* cited by examiner

METHOD FOR CONTROLLING ELECTRICAL POWER TRANSMISSION TO A VEHICLE

BACKGROUND AND SUMMARY

The present invention relates to a method for controlling electrical power transmission to a vehicle. The invention also relates to a control unit configured to control electrical power transmission to a vehicle as well as a corresponding vehicle comprising such a control unit. The invention is applicable on vehicles, such as e.g. low-, medium- or heavy duty vehicles also commonly referred to as trucks. Although the invention will mainly be described in relation to a truck, it may also be applicable for other types of vehicles such as e.g. cars, etc.

Electrical driven vehicles are becoming increasingly popular since the demand on e.g. pollution etc. is continuously increasing from the market. An approach of electrical driven vehicles is to provide charging from charge segments positioned in e.g. the road where the vehicle is driven. These systems are often referred to as electrical road system (ERS) and the vehicles are thus referred to as ERS-vehicles. These ERS-vehicles often comprise a conductor that is arranged to be positioned in contact with the charge segments of the road in order to receive charge current therefrom.

For safety reasons the charge segments are provided with electrical charge current only within a short time period before the ERS-vehicle arrives at the charge segment. The reason is that e.g. pedestrians or animals should not be able to touch a charge segment which is provided with electrical charge current. Accordingly, the charge segments are continuously switched on and off but the ERS-vehicle continuously receives charge current since the charge segments are turned on when the vehicle arrives at the respective segment. Hence, the charge segments are controllably supplied with electrical current.

Although prior art ERS-vehicles continuously receive charge current from the charge segments of the road, they are still in need of further improvements in terms of e.g. charge planning from the charge segments, etc.

It is desirable to provide a method that improves electrical power transmission to a vehicle in comparison to the prior art.

According to a first aspect of the present invention, there is provided a method for controlling electrical power transmission to a vehicle, the vehicle comprising a charging component receiving electrical charge current from individually controlled charge segments along a road for the vehicle, wherein the method comprises the steps of receiving a signal indicative of a charge current mode for the charge segments along the road; determining if at least one charge segment ahead of the vehicle is provided in a disabled charge mode and currently not being able to provide an electrical charge current; calculating a time period until the vehicle arrives at the charge segment provided in the disabled charge mode; and shutting off the electrical power transmission to the vehicle within a predetermined time period of the calculated time period.

The wording "charge current mode" should in the following and throughout the entire description be understood to mean a mode of operation of the charge segment, i.e. if it is able to provide charge current or not. The charge current mode may hence be an "enabled charge mode" where the charge segment is able to supply electrical charge current to the vehicle when the vehicle arrives at the position of the charge segment, or a "disabled charge mode" where the charge segment is unable, for some reason, to provide electrical charge current to the vehicle when the vehicle arrives at the position of the charge segment. The received signal of the charge current mode may relate to both static information as well as dynamic information. Static information may be e.g. stopped vehicle ahead, or a malfunctioning charge segment, etc. Dynamic information may, for example, relate to a situation that night occur due to slowing traffic ahead, etc. The charge segment may thus be provided in the "disabled charge mode" if the charge segment, for some reason, is e.g. malfunctioning and unable to supply electrical charge current when the vehicle arrives. The charge segment may be provided in the "disabled charge mode" for other reasons as well, such as e.g. if the traffic situation at the charge segment is such that the vehicles are driving at a relatively slow speed, or even standing still due to e.g. traffic jam etc., since in such situation there may be an increased risk that, for example, a person walks on the road and accidentally touches the charge segment.

Power transmission to the vehicle should be understood to mean that a battery or any other energy storage of the vehicle is charged by means of the charging component and the charge segments of the road. The vehicle may be conductively charged, as will be descried further below, or inductively charged. The wording "power transmission to the vehicle" should also be understood to include that electrical current is supplied to the vehicle from the charge segments for directly propelling the vehicle. For simplicity of understanding, the following will mainly describe the power transmission to the vehicle in terms of charging a vehicle. Thus, electrical current can be transmitted for both propelling the vehicle and for charging an energy storage in the vehicle at the same time, or alternatively only for charging or only for propelling the vehicle.

The signal indicative of a charge current mode for the charge segments along the road may be transmitted by wireless communication from each of the segments, including the charge segment provided in the "disabled charge mode", along the road and received by e.g. a control unit of the vehicle. Any suitable technique known by the skied person may be used for the wireless communication, such as e.g. Bluetooth, Wi-Fi, 3G/4G, laser signals, ultrasound signals, etc. Furthermore, it should be understood that the invention is not limited to a situation where each of the charge segments directly transmits a signal to the vehicle, the charge segment may equally as well provide a signal, either wireless or by wire, to a central control unit which analyses the signal and wirelessly transmits a signal to the vehicle, which signal contains information of the respective charge segments. Other alternatives are of course conceivable, the signal can, for example, be transmitted as a chain between consecutive charge segments of the road until it is received by the control unit of the vehicle.

Furthermore, the wording "shutting off the electrical power transmission to the vehicle" should be understood to mean that e.g. the electrical charging of the vehicle energy storage has been shut off before the charging component of the vehicle stops receiving electrical charge current from the charge segments of the road. In case the vehicle conductively receives charge current from the charge segment of the road, the electrical charging of the vehicle is shut off before the charging component is lifted above the ground, i.e. before the charging component and the charge segments cease to be in contact with one another. Hence, the control system of the vehicle shuts off the electrical charging although the charging component is in contact with the electrified charge segments of the road.

An advantage is that the vehicle is able to plan and execute a controlled and automatic shut down of electrical power transmission, e.g. electrical charging, at an optimal distance from the charging segment provided in the disabled charge mode. Hence, the vehicle can be charged during an approximately maximum time period which increases electrical charging when driving at the road with the charge segments. Furthermore, controllably shutting off electrical charging of the vehicle is beneficial in comparison to an abrupt disconnection of the electrical charging that would occur if the vehicle continues to try to electrically charge the vehicle when arriving at the disabled charge segment. Such abrupt disconnection of electrical charging increases the risk of electrical problems since it may increase the risk of receiving an arc discharge between the charging component and the disabled charge segment. A further advantage is that an automatic system is provided which is independent on the ability/experience of a vehicle operator. Hence, the vehicle operator does not need to actively control when to stop charging the vehicle. The operator can thus instead focus on the current traffic situation.

According to an example embodiment, the method may continuously calculate the time period until the vehicle arrives at the charge segment provided in the disabled charge mode.

Hereby, the vehicle can receive up-to date information of the time period until arriving at the charge segment provided in the disabled charge mode. The time period may change due to e.g. changed vehicle speed which may allow the vehicle to be electrically charged for an increased time period if the vehicle speed is reduced and there is an increased time period until arriving at the charge segment provided in the disabled charge mode. Furthermore, and as will also be described below, an advantage is that in cases where the charge segment is changed from a disabled charge mode to an enabled charge mode, the vehicle may decide not to shut off the electrical charging.

According to an example embodiment, the method may comprise the steps of receiving a signal indicative of a change in the charge current mode for at least one of the charge segments provided in the disabled charge mode; determining if the at least one charge segment ahead of the vehicle is changed from a disabled charge mode to an enabled charge mode; determining if another one of the charge segments ahead of the vehicle is provided in a disabled charge mode; and re-calculating the time period until the vehicle arrives at the charge segment provided in the disabled charge mode.

The wording "changed from a disabled charge mode to an enabled charge mode" should be understood to mean that a charge segment that was previously determined to be unable to provide electrical charge current to the vehicle has been determined to be able to provide electrical charge current. Hereby, there is no need to shut off the electrical charging of the vehicle when arriving at the enabled charge segment. The charge segment may be changed from the disabled charge mode to the enabled charge mode based on the traffic situation, where a previous traffic jam, at which the charge segments were provided in the disabled charge mode, has been resolved such that the charge segments are provided in the enabled charge mode.

An advantage is thus that the vehicle contiguously receives updated information of the charge current mode of the charge segments ahead of the vehicle and updates the time period until shutting off the electrical charging of the vehicle. Hence, the step of re-calculating the time period until the vehicle arrives at the charge segment provided in the disabled charge mode is executed before the step of shutting off the electrical charging of the vehicle.

According to an example embodiment, the method may comprise the steps of receiving a signal indicative of a plurality of charge segments ahead of said vehicle being provided in the disabled charge mode; determining a charge status of the vehicle when the vehicle is determined to arrive at the plurality of charge segments provided in the disabled charge mode; calculating a distance said determined charge status will be able to propel the vehicle; and if an accumulated distance of the plurality of charge segments provided in the disabled charge mode is longer than the calculated distance; providing a signal indicative of an alternative charging method for the vehicle.

Hereby, alternative charging of the vehicle is suggested in cases where it is determined that the vehicle is unable to be propelled by the present electrical charge level of the vehicle until arriving at a charge segment provided in the enabled charge mode. Hence, if too many charge segments of the road is provided in the disabled charge mode, the vehicle energy storage may need alternative charging to be able to propel the vehicle. The charge status should thus be understood as the electrical charge level of e.g. the vehicle energy storage.

According to an example embodiment, the method may comprise the steps of receiving a signal from the last upcoming charge segment of the road; and shutting off the electrical power transmission to the vehicle within a predetermined time period before the vehicle arrives at an end portion of the last upcoming charge segment of the road.

Hereby, electrical power transmission to the vehicle is shut off a short time period before the vehicle leaves the road provided with charge segments. Accordingly, the end portion of the last upcoming charge segment should be understood to mean the final portion, in the longitudinal direction as seen in the driving direction of the vehicle, of the last upcoming charge segment.

According to an example embodiment, the method may comprise the step of providing an accelerated shut-down of the electrical power transmission to the vehicle if the calculated time period until said vehicle arrives at the charge segment provided in the disabled charge mode is determined to be within a predetermined critical time period. Hereby, the electrical power transmission can be shut off by lifting the charging component above the ground. Accordingly, electrical charge current may still be provided between the charge segments and the charging component of the vehicle when shutting off the electrical charging by means of the accelerated shut-down.

According to an example embodiment, the charging component may receive conductive charge current from the individually controlled charge segments along the road.

Hereby, the charging component may be arranged below the vehicle and controllably directed towards the road when charging is desired. Likewise, and as described above, the charging component can be controllably lifted above the ground if desired. During normal operations, the above described slut-off of electrical charging is not performed by lifting the charging component off the ground. Rather, the shut-off of electrical charging is performed by controllably tuning off electrical charging of e.g. the vehicle energy storage before the charging component is lifted above the ground.

Further details of the charging component are given below in relation to the fifth aspect of the invention.

According to a second aspect of the present invention, there is provided a control unit configured to control electrical power transmission to a vehicle, the vehicle comprising a charging component adapted to receive electrical charge current from individually controlled charge segments along a road for the vehicle, wherein the control unit is configured to receive a signal indicative of a charge current mode for the charge segments along the road; determine if at least one charge segment ahead of the vehicle is provided in a disabled charge mode and currently not being able to provide an electrical charge current; calculate a time period until the vehicle arrives at the charge segment provided in the disabled charge mode; and to send a control signal to a charging system of the vehicle to shut off the electrical power transmission to the vehicle within a predetermined time period of the calculated time period.

Effects and features of the second aspect are largely analogous to those described above in relation to the fast aspect.

According to a third aspect of the present invention, there is provided a computer program comprising program code means for performing any of the steps described above in relation to the first aspect when the program is run on a computer.

According to a fourth aspect of the present invention, there is provided a computer readable medium carrying a computer program comprising program means for performing any of the steps described above in relation to the first aspect when said program product is run on a computer.

Effects and features of the third and fourth aspects are largely analogous to those described above in relation to the first aspect of the present invention.

According to a fifth aspect of the present invention, there is provided a vehicle comprising a charging component adapted to receive electrical current from individually controlled charge segments along a road, wherein the vehicle comprises a control unit according to the above description of the second aspect of the present invention. The electrical current is preferably electrical charge current.

According to an example embodiment, the charging component may be adapted to conductively receive current from the individually controlled charge segments along the road. Conductive charging of the vehicle energy storage is beneficial since the weight of components is relatively low and the electrical utilization ratio between the charging component and the charge segments of the road is relatively high.

According to an example embodiment, the charging component may be arranged to be controllably directed towards the charge segments along the road.

According to an example embodiment, the charging component may be positioned below the longitudinal frame of the vehicle and adapted to be controllably directed towards charge segments positioned in the ground surface of the road. Hereby, the vehicle receives electrical charge current from charge segments positioned in the ground surface. It should however be understood that the charge segments may be arranged on e.g. the safety fence of the road. In such situation, the charging component is preferably positioned on the side of the vehicle. Other alternatives are of course also conceivable.

Further effects and features of the fifth aspect are largely analogous to those described above in relation to the first aspect of the present invention.

Further features of and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAIL DESCRIPTION

Figure 1:
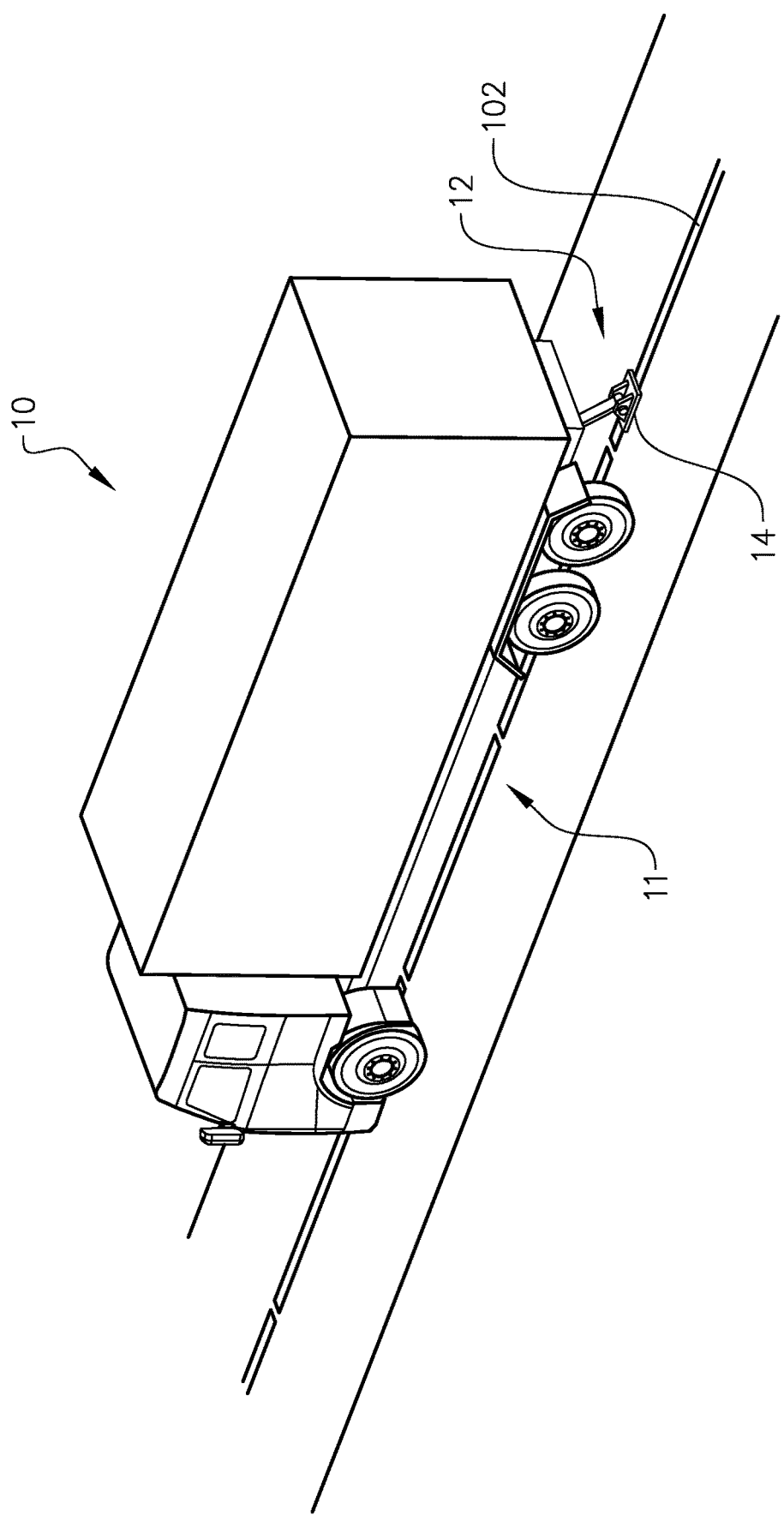
FIG. 1 is a perspective view of a vehicle according to an example embodiment driving on a road provided with a plurality of charge segments.

The present invention will now be described more fully hereinafter with reference to the accompanying drawings, in which exemplary embodiments of the invention are shown. The invention may, however, be embodied in many different forms and should not be construed as limited to the embodiments set forth herein rather, these embodiments are provided for thoroughness and completeness. Like reference character refer to like elements throughout the description. The following will describe the present invention in relation to electrical charging of the vehicle; although the electric power supply from the charge segments can be used for e.g. directly propelling the vehicle without charging the vehicle.

FIG. 1 is a perspective view of a vehicle 10 according to an example embodiment driving on a road 11 provided with a plurality of charge segments 102 which will be described in further detail with reference to FIG. 2 below. The vehicle 10, here illustrated as a truck which preferably is an electric vehicle or a hybrid electric vehicle, further comprises a charging component 12 which is arranged to receive electrical charge current from the charge segments 102. In detail, the charging component 12 is configured to be positioned in an inactive position where no contact is present between a current collector 14 of the charging component 12 and the charge segments 102, and in an operative condition where the current collector 14 and the charge segments 102 are in physical contact with each other. Hence, ii the inactive position the charging component 12 is lifted upwardly towards the vehicle, and in the operative condition the charging component 12 is lowered downwardly for contacting the charge segments 102 of the road 11.

The vehicle 10 depicted in FIG. 1 thus conductively receives electrical charge current from the charge segments 102 along the road 11. However, the invention should not be construed as limited to conductive charging since inductive charging may function equally as well. Conductive charging thus only serves as an illustrative example.

Furthermore, the present invention should not be construed as limited to charge segments 102 positioned below the vehicle 10 on the ground surface as depicted in FIG. 1. The invention should be understood to function equally as well with charge segments 102 arranged e.g. beside the vehicle on a safety fence or the like, i.e. a side-rail charging system. The charging component 12 is in the latter situation substantially horizontally movable between the inactive position and the operative condition. If the charge segments 102 are positioned below the vehicle 10 on the ground as depicted in the figures, the charging component 12 is substantially vertically movable between the inactive position and the operative condition.

Figure 2:
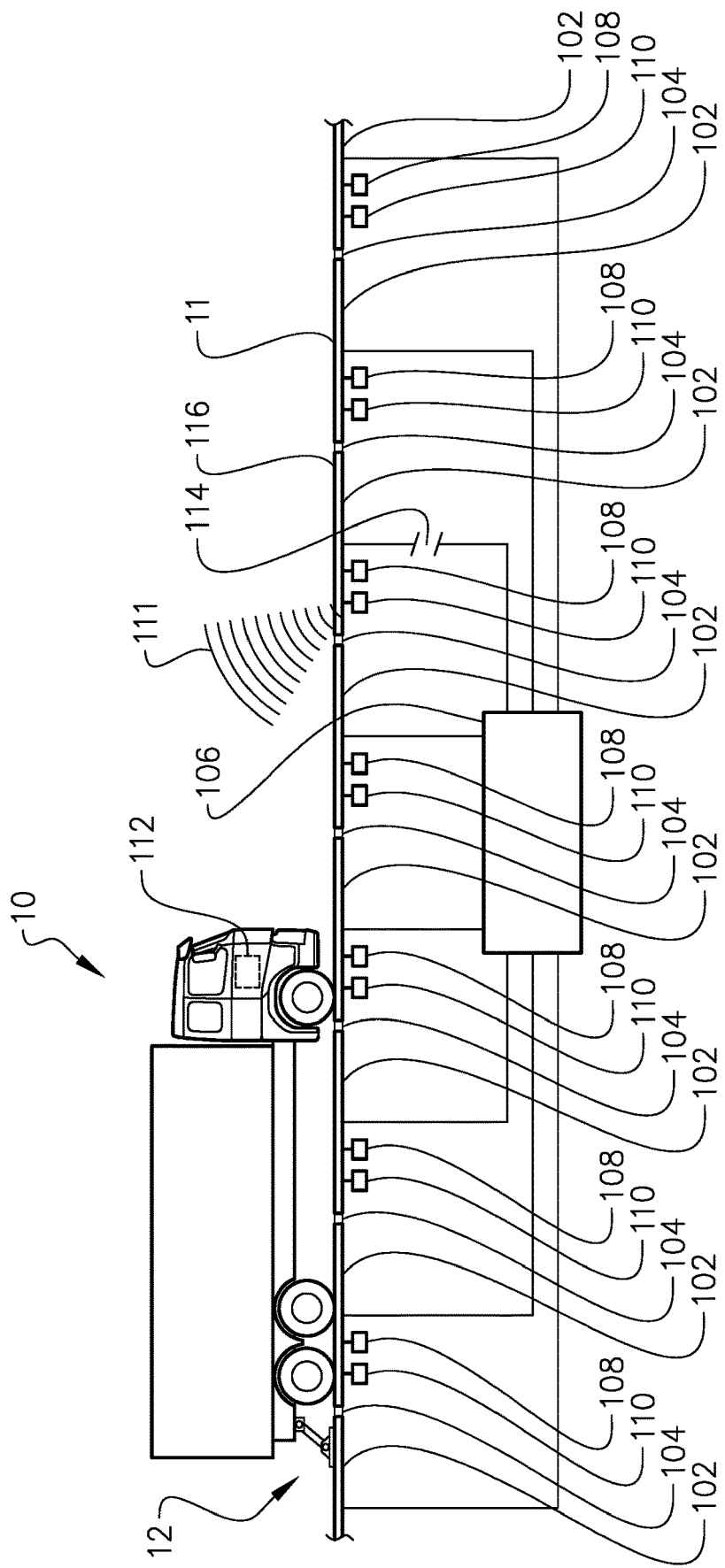
FIG. 2 is a schematic side view illustrating an example embodiment of the plurality of charge segments along the road and their interaction with the vehicle.

Reference is now made to FIG. 2 which illustrates a schematic side view of an example embodiment of the plurality of charge segments 102 along the road 11 and their interaction with the vehicle 10. As depicted, the road 11 comprises a plurality of charge segments 102 which are arranged at predetermined intervals relative to each other along the road 11. An electrical isolation 104 is arranged between two consecutive charge segments 102 for preventing leakage current between consecutively arranged charge segments 102. Furthermore, the charge segments 102 are each connected to a central control unit 106. The central control unit 106 is configured to controllably supply electrical current to each of the charge segments 102. The central control unit 106 can also be arranged to receive data from each of the charge segments 102 with information relating to e.g. their operational status, i.e. if they are functioning properly, or with environmental data from the surrounding environment of the respective charge segments 102 received from sensors or cameras etc. The charge segments 102 may alternatively receive electrical charge current from another power supply (not shown) where the central control unit 106 is arranged to control when each of the charge segments 102 is allowed to receive charge current from the power supply.

Furthermore, each of the charge segments 102 comprises means 108 for detecting that a vehicle is approaching, which means may be a sensor or camera etc. The means 108 for detecting an approaching vehicle 10 is in particular adapted to determine that a vehicle 10 able to receive charge current from the charge segments 102 is approaching. Also, the means 108 for detecting an approaching vehicle 10 is also adapted to determine the vehicle speed of the vehicle approaching. It should however be understood that the means 108 for detecting an approaching vehicle may also be arranged as a sensor system (not shown) which is directly connected to the central control unit 106 which in turn can transmit a signal to the respective charge segments 102 or to the approaching vehicle.

Still further, each of the charge segments 102 also comprises a transmitter 110 which is arranged to transmit a signal 111 to the approaching vehicles. The transmitted signal 111 may comprise data information relating to e.g. the status of each of the charge segments 102. It should be readily understood that although FIG. 2 only illustrates that one of the charge segments transmits data, al of the charge segments 102 along the mad is able to transmit data relating to their respective status. Furthermore, the transmitters 110 may form an integral part of the respective charge segment 102, i.e. they may be arranged in the respective charge segments 102. The arrangement depicted in FIG. 2, where the transmitters 110 are arranged as an external part connected to the respective charge segment 102 thus merely serves as a schematic illustration for simplified understanding of the present invention.

The invention is however not limited to the embodiment depicted in FIG. 2 since the main object is that the transmitted data contains information relating to the specific charge segment. For example, the charge segments 102 may transmit data to the central control unit 106, wireless or by wire, which in turn wirelessly, or by other suitable means, transmits the data to the vehicle 10 on the road 11. Also, the means 108 for detecting a vehicle and its vehicle speed, and the transmitter 110 may be arranged as a single device instead of the two separate devices as depicted in FIG. 2.

Moreover, the vehicle 10 comprises a control unit 12 which comprises a transmitter and a receiver (not shown). The transmitter is arranged to transmit data to each of the charge segments 102 and/or to the central control unit 106. The transmitted data may comprise information that the vehicle is approaching the respective charge segments 102 and at which speed the vehicle 10 is currently driving. Hence, instead of: or as a complement to, the means 108 for detecting an approaching vehicle 10, the charge segments 102 and/or the central control unit 106 may comprise a receiver for receiving such information from the control unit 112 of the vehicle. Furthermore, the receiver of the control unit 112 may receive information from each of the charge segments 102 or from the central control unit 106.

The following will now describe the functionality of the present invention with reference to FIG. 2. When the vehicle 10 is driven along the road 11 provided with the plurality of charge segments 102, it is arranged to e.g. charge the vehicle energy storage, by receiving electrical charge current from the charge segments 102. Before the vehicle 10 arrives at the respective charge segment 102, the charge segment 102 is disconnected and no electrical charge current is supplied thereto. A predetermined time period before the vehicle 10 arrives at the charge segment 102, the charge segment 102 is connected and a charge current can be provided to the charging component 12 of the vehicle 10. Hence, the charge segments 102 are continuously switched on and off in dependence of whether a vehicle 10 able to receive charge current from the charge segments 102 is present at the respective charge segments 102. The charge segments 102 are hence individually controlled to be provided with electrical charge current for charging the vehicle 10. Accordingly, when the vehicle 10 is driving on the road 11, the charging component 12 continuously receives electrical charge current from the charge segments 102 along the road 11.

There are however situations when one or more of the charge segments 102 will be provided in a disabled charge mode and thus unable to supply electrical charge current to the charging component 12 of the vehicle 10. The disabled charge mode is in FIG. 2 illustrated with a broken line 114 and the charge segment provided in the disabled charge mode is illustrated with reference numeral 116. Such situation may, for example occur if the charge segment 102, 116 is malfunctioning and thus not able to receive electrical current from the central control unit 106, or not able to supply electrical charge current to the charging component 12 of the vehicle 10. Another situation, which is not illustrated in the figures, may be that there is a traffic jam at the charge segment 116 or vehicles are driving restively slowly at the charge segment 116 such that it is turned off and will not, due to safety reasons, be able to supply electrical charge current to the charging component 12 when the vehicle 10 arrives.

Before arriving at a charge segment 116 that is unable to supply charge current to the charging component 12, it is desirable to shut off the electrical charging of the vehicle energy storage. Hereby, the risk of electrical problems associated with an uncontrolled interruption of the electrical charging is reduced. Also, by controllably shutting off the electrical charging of the vehicle, the vehicle can be charged during an optimized time period before arriving at the charge segment 116 currently unable to supply charge current.

Hereby, the vehicle, traveling with a specific vehicle speed, can calculate the time period until arriving at the charge segment provided in the disabled charge mode and thus determine when charging should be terminated and when the charging component should be lifted above the ground.

When the vehicle 10 is driven on the road 11, the charge segments 102, 116 transmit signals to the control unit 112 of the vehicle 10. The signals are indicative of a charge current mode for the respective charge segments 102, i.e. whether the respective charge segment 102 is provided in a disabled charge mode and not able to supply electrical charge current to the charging component 12 when the vehicle 10 arrives, or is provided in an enabled charge mode and will be able to supply electrical charge current to the charging component 12 when the vehicle 10 arrives.

If the transmitted signal from the charge segment 116 is indicative of a disabled charge mode, the control unit 12 of the vehicle 10 calculates a time period until it will arrive at the disabled charge segment 116 and determines to shut off the electrical charging of the vehicle energy storage a predetermined time period before arriving at the disabled charge segment. Hereby, the vehicle energy storage is charged until the vehicle arrives at the disabled charge segment, where the charging of the energy storage is shut off.

There may however be situations where the charge current mode of a charge segment 102 is changed from a disabled charge mode to an enabled charge mode. Since it should be understood that the control unit 112 of the vehicle continuously receives a transmitted signal from the charge segments 102, the control unit 112 of the vehicle 10 can dismiss the previously calculated time period and instead decide to continue to electrically charge the energy storage of the vehicle. However, the charge current mode of another charge segment 102 may be changed from an enabled charge mode to a disabled charge mode and the control unit 112 of the vehicle then instead re-calculates the time period until arriving at the charge segment provided in the disabled charge mode and shuts off the electrical charging a predetermined time period before arrival thereto.

Furthermore, if the vehicle receives a signal from a plurality of charge segments 102 which is indicative of a disabled charge mode for the plurality of charge segments 102, the control unit 112 of the vehicle 10 can receive a charge status for the vehicle 10 and calculate the distance the vehicle 10 can be propelled with the received charge status. If the calculated distance is shorter than the distance to a target destination for the vehicle, or shorter than a calculated distance to the next coming charge segment provided in the enabled charging mode, the control unit 112 of the vehicle 10 can instruct the vehicle operator to reroute the vehicle 10 and provide an alternative charging method for the vehicle 10. Such alternative charging method may, for example, be to pull over and charge the vehicle energy storage at a stationary charging station.

Furthermore, the control unit 112 of the vehicle 10 may also receive a signal from the last charge segment 102 of the road 11. The control unit 112 of the vehicle 10 may then decide to shut off the electrical charging of the energy storage a predetermined time period before arriving at an end portion of the last charge segment 102 of the road 11.

Figure 3:
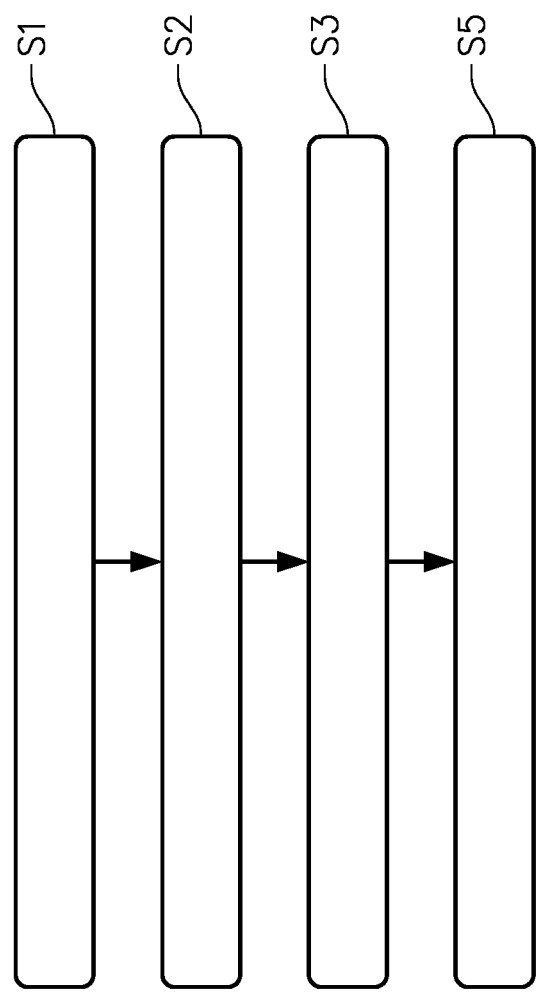
FIG. 3 is a flow chart of a method for controlling electrical charging of a vehicle according to an example embodiment.
Figure 4:
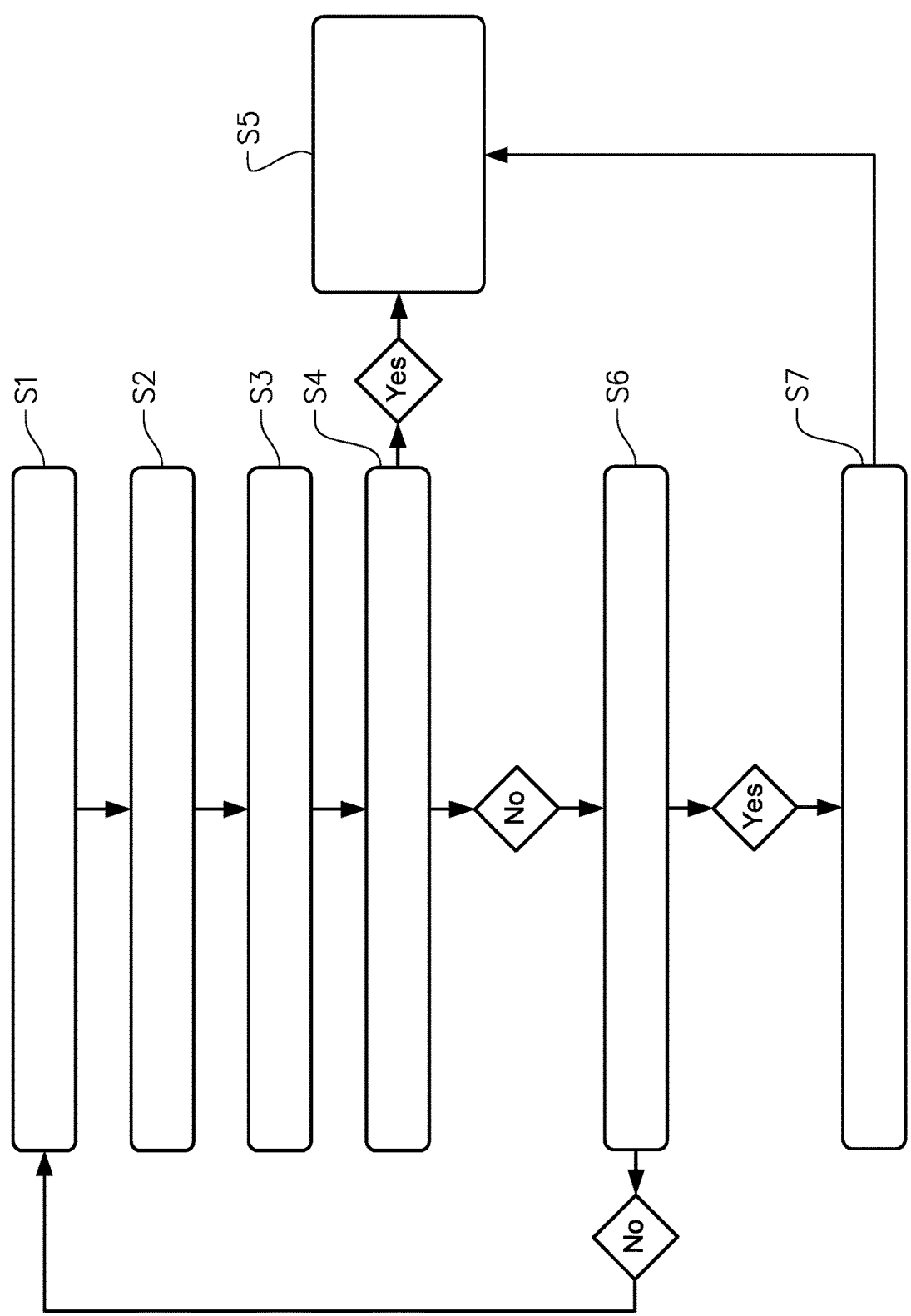
FIG. 4 is a flow chart of a method for controlling electrical charging of a vehicle according to another example embodiment.

In order to sum up, reference are made to FIGS. 3 and 4 which illustrate flow charts of embodiments of the method for controlling electrical charging of the vehicle. Firstly and with particular reference to FIG. 3, the control unit 112 of the vehicle 10 receives S1 a signal from at least one of the charge segments 102 ahead of the vehicle, which signal is indicative of a charge current mode for the charge segment 102. The control unit 112 thereafter determines S2 if the charge segment 102 ahead of the vehicle 10 is provided in the disabled charge mode and unable to provide an electrical charge current to the charging component 12 when the vehicle 10 arrives at the charge segment 116. Thereafter, the control unit 112 calculates S3 a time period until the vehicle 10 will arrive at the charge segment 116 provided in the disabled charge mode. If it is determined that the charge segment 116 is in the disabled charge mode, the control unit 112 of the vehicle 10 sends a control signal to shut off S5 the electrical charging of the vehicle energy storage before the vehicle arrives at the charge segment 116 provided in the disabled charge mode.

With reference to FIG. 4, the steps S1-S3 are executed/performed as described above. However, during driving towards the charge segment 116 provided in the disabled charge mode, signals are continuously received for determining S4 if the charge segment 116 is still provided in the disabled charge mode. If it is determined that the charge segment 116 is still provided in the disabled charge mode, the control unit 112 of the vehicle 10 sends the control signal to shut off S5 the electrical charging of the vehicle energy storage before the vehicle arrives at the charge segment 116 provided in the disabled charge mode.

On the other hand, if it is determined that the charge current mode has been changed from the disabled charge mode to the enabled charge mode, it is determined if another charge segment is provided in the disabled charge mode S6. If none of the charge segments 102 ahead of the vehicle 10 is provided in the disabled charge mode, the method restarts and the control unit 112 again receives S1 a signal from at least one of the charge segments 102 ahead of the vehicle indicative of a charge current mode for the charge segments 102. On the other hand, if another charge segment 102 is provided in the disabled charge mode, the control unit 112 re-calculates S7 the time period until the vehicle will arrive at the charge segment provided in the disabled charge mode and provides a control signal for shutting off S5 the electrical charging of the vehicle energy storage a predetermined time period before the vehicle arrives at the charge segment provided in the disabled charge mode.

It is to be understood that the present invention is not limited to the embodiments described above and illustrated in the drawings; rather, the skilled person will recognize that many changes and modifications nay be made within the scope of the appended claims. For example, the control unit may decide not to turn on the electrical charging of the vehicle energy storage if it is determined that only a single charge segment out of a plurality of charge segments is provided in the enabled charge mode. Also, although the above description relates the time period until shutting off electrical charging of the vehicle, it should be understood that the inventive concept functions also for the situation when charging of the vehicle should be initiated. Hence, the control unit of the vehicle can calculate a time period until arriving at a charge segment provided in the "enabled charge mode" and determine when to lower the charging component and initiate charging of the vehicle.

The invention claimed is:

1. A method for controlling electrical power transmission to a vehicle, the vehicle comprising a charging component receiving electrical charge current from individually controlled charge segments along a road for the vehicle, the charging component being configured to be positioned in an inactive position where no contact is present between the charging component and the charge segments, and an operative condition where the charging component and the charge segments are in physical contact with each other, the method being comprising: receiving a signal indicative of a charge current mode for the charge segments along the road; determining if at least one charge segment ahead of the vehicle is provided in a disabled charge mode and currently not being able to provide an electrical charge current when the vehicle arrives at the at least one disabled charge segment; calculating a time period until the vehicle arrives at the charge segment provided in the disabled charge mode; and shutting off the electrical power transmission to vehicle within a predetermined time period of the calculated time period by positioning the charging component in the inactive position.

2. The method according to claim 1, comprising continuously calculating the time period until the vehicle arrives at the charge segment provided in the disabled charge mode.

3. The method according to claim 1, comprising: receiving a signal indicative of a change in the charge current mode for at least one of the charge segments provided in the disabled charge mode; determining if the at least one charge segment ahead of the vehicle is changed from a disabled charge mode to an enabled charge mode; determining if another one the charge segments ahead of the vehicle is provided in a disabled charge mode; and re-calculating the time period until the vehicle arrives at the charge segment provided in the disabled charge mode.

4. The method according to claim 1, comprising: receiving a signal indicative of a plurality of charge segments ahead of the vehicle being provided in the disabled charge mode; determining a charge status of the vehicle when the vehicle is determined to arrive at the plurality of charge segments provided in the disabled charge mode; calculating a distance the determined charge status will be able to propel the vehicle; and if an accumulated distance of the plurality of charge segments provided in the disabled charge mode is longer than the calculated distance; providing a signal indicative of an alternative charging method for the vehicle.

5. The method according to claim 1, comprising: receiving a signal from the last upcoming charge segment of the road; and shutting off the electrical power transmission to the vehicle within a predetermined time period before the vehicle arrives at the last upcoming charge segment of the road.

6. The method according to claim 1, comprising: providing an accelerated shut-down of the electrical power transmission of the vehicle if the calculated time period until the vehicle arrives at an end portion of the charge segment provided in the disabled charge mode is determined to be within a predetermined critical time period.

7. The method according to claim 1, comprising the charging component receiving a conductive charge current from the individually controlled charge segments along the road.

8. A computer comprising a computer program for performing the steps of claim 1 when the program is run on the computer.

9. A non-transitory computer readable medium carrying a computer program for performing the steps of claim 1 when the program product is run on a computer.

10. A control unit configured to control electrical power transmission to a vehicle, the vehicle comprising a charging component adapted to receive electrical charge current from individually controlled charge segments along a road for the vehicle, the charging component being configured to be positioned in an inactive position where no contact is present between the charging component and the charge segments, and an operative condition where the charging component and the charge segments are in physical contact with each other wherein the control unit is configured to: receive a signal indicative of a charge current mode for the charge segments along the road; determine if at least one charge segment ahead of the vehicle is provided in a disabled charge mode and currently not being able to provide an electrical charge current when the vehicle arrives at the at least one disabled charge segment; calculate a time period until the vehicle arrives at the charge segment provided in the disabled charge mode; and send a control signal to a charging system of the vehicle to shut off the electrical power transmission to the vehicle within a predetermined time period of the calculated time period by positioning the charging component in the inactive position.

11. A vehicle comprising a charging component adapted to receive electrical current from individually controlled charge segments along a road, wherein the vehicle comprises a control unit according to claim 10.

12. The vehicle according to claim 11, wherein the charging component is adapted to conductively receive current from the individually controlled charge segments along the road.

13. The vehicle according to claim 11, wherein the charging component is arranged to be controllably directed towards the charge segments along the road.

14. The vehicle according to claim 11, wherein the charging component is positioned below the longitudinal frame of the vehicle and adapted to be controllably directed towards charge segments positioned in the ground surface of the road.

* * * * *